UNITED STATES PATENT OFFICE.

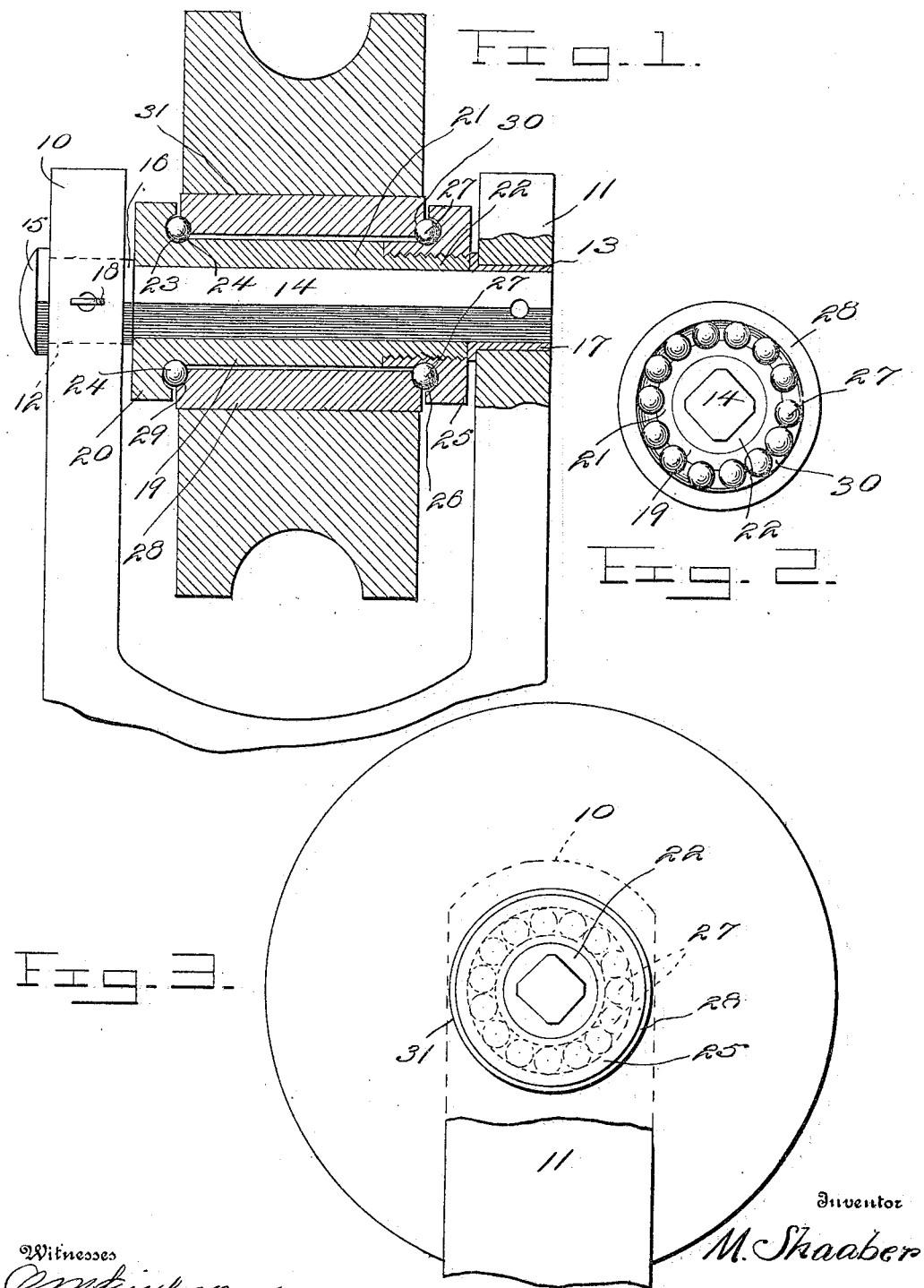

MAHLON SHAABER, OF READING, PENNSYLVANIA.

BALL-BEARING TROLLEY-WHEEL BUSHING.

No. 809,852.  Specification of Letters Patent.  Patented Jan. 9, 1906.

Application filed April 4, 1905. Serial No. 253,855.

*To all whom it may concern:*

Be it known that I, MAHLON SHAABER, a citizen of the United States, residing at Reading, in the county of Berks, State of Pennsylvania, have invented certain new and useful Improvements in Ball-Bearing Trolley-Wheel Bushings; and I do hereby declare the following to be a full, clear, and exact description of the invention, such as will enable others skilled in the art to which it appertains to make and use the same.

This invention relates to trolley-wheels in general, and more particularly to bushings therefor, the object of the invention being to provide a substitute for the usual graphite bushing which will not be susceptible to the rapid wear of such bushing, so that sparking and the evils incident thereto will be prevented.

A further object of the invention is to provide a construction which will eliminate the necessity for use of contact plates or ribbons at the ends of the wheel and in which, furthermore, the parts may be easily and quickly assembled and disassembled.

Other objects and advantages of the invention will be understood from the following description.

In the drawings forming a portion of this specification, and in which like numerals of reference indicate similar parts in the several views, Figure 1 is a section taken longitudinally through a trolley-wheel equipped with the present invention, a portion of the harp of the trolley-arm being illustrated. Fig. 2 is an end view of the bushing with the adjustable cone removed. Fig. 3 is a side elevation of the wheel with the bushing in place, a portion of the harp being broken away.

Referring now to the drawings, there is illustrated a portion of a trolley mechanism including the harp at the upper end of the usual trolley-arm and which harp comprises laterally-spaced members 10 and 11, in which are formed alining angular openings 12 and 13 to receive the trolley-pin 14. The trolley-pin is angular in cross-section, and directly adjacent to the head 15 at one end is a slight enlargement 16, which snugly engages the perforation 12, there being an angular sleeve 17 removably disposed upon the opposite end of the pin to fit the perforation 13. To hold the pin in place cotters 18 are employed, which are engaged through perforations in the members 10 and 11 of the harp and through corresponding perforations in the pin and the sleeve 17.

Upon the pin 14 is fitted a sleeve 19, having a central longitudinal passage that snugly and slidably receives the pin 14, the sleeve being held securely between the enlargement 16 of the pin and the flanged inner end of the collar 17. The sleeve 19, which is cylindrical, has its major portion at one end, as shown at 20, while its central portion is reduced in diameter, as shown at 21, and its opposite end portion is further reduced in diameter, as shown at 22, and is exteriorly threaded. In the angle between the portions 20 and 21 is formed a ball-race 23, in which are disposed a series of bearing-balls 24, which are in substantially continuous contact with the race and are designed for a purpose to be presently explained. Upon the portion 22 of the sleeve is screwed a bearing-cone 25, the minor or inner end portion of which is flush with the portion 21 of the sleeve, and in the angle between the minor and major portions of the cone is a ball-race 26, corresponding to the race 23, and in which are received bearing-balls 27.

Between the major portion 20 of the sleeve 19 and the major portion of the bearing-cone is disposed a ring 28, the inner edges at the ends of which are cut away to form races 29 and 30, which receive the balls 24 and 27, respectively, in connection with the races 23 and 26, respectively, the balls serving to hold the rings out of contact with the sleeve and cone and the ring having slightly greater external diameter than the major portion of either the sleeve or cone. This provides for slipping the trolley wheel or rim 31 either over the portion 20 or the cone 25 onto the ring 28, it being understood, however, that, if desired, the rim of the wheel may be forced onto the ring 28 before the latter is put in place upon the bearing-balls. With this construction it will be noted that the ring 28, which forms the lining for the wheel-rim has a ball-bearing, there being a sufficient number of balls to insure an efficient conduction of current from the wheel-rim to the trolley-arm.

What is claimed is—

1. The combination with a trolley-wheel rim and a trolley-harp having a cross-sectionally-angular pin engaged therein, of a sleeve having a cross-sectionally-angular longitudinal passage in which the pin is snugly fitted, said sleeve comprising a major end portion a reduced middle portion and a further reduced and threaded end portion and having a ball-race in the angle between the major and intermediate portions, a bearing-cone engaged upon the threaded portion of the sleeve and having a race, a ring disposed about the sleeve and having end races in coöperative relation to the races of the sleeve and cone respectively, said ring being snugly fitted in the rim, and balls in the races.

2. A bushing for trolley-wheels comprising a sleeve comprising a major end portion, an intermediate reduced portion and a further reduced end portion provided with threads, said sleeve having a race in the angle between its major and intermediate portions, a cone engaged upon the threaded end portion of the sleeve and provided with a race, and a ring encircling the sleeve and having end races in coöperative relation to the sleeve and cone respectively and bearing-balls engaged in the races.

In testimony whereof I affix my signature in presence of two witnesses.

MAHLON SHAABER.

Witnesses:
WM. F. SHAMMAN,
EDWARD A. WILKINSON, Sr.